Sept. 3, 1929.  C. G. JOHNSON  1,727,288
METHOD FOR PHOTOGRAPHING OBJECTS
Filed Nov. 29, 1926
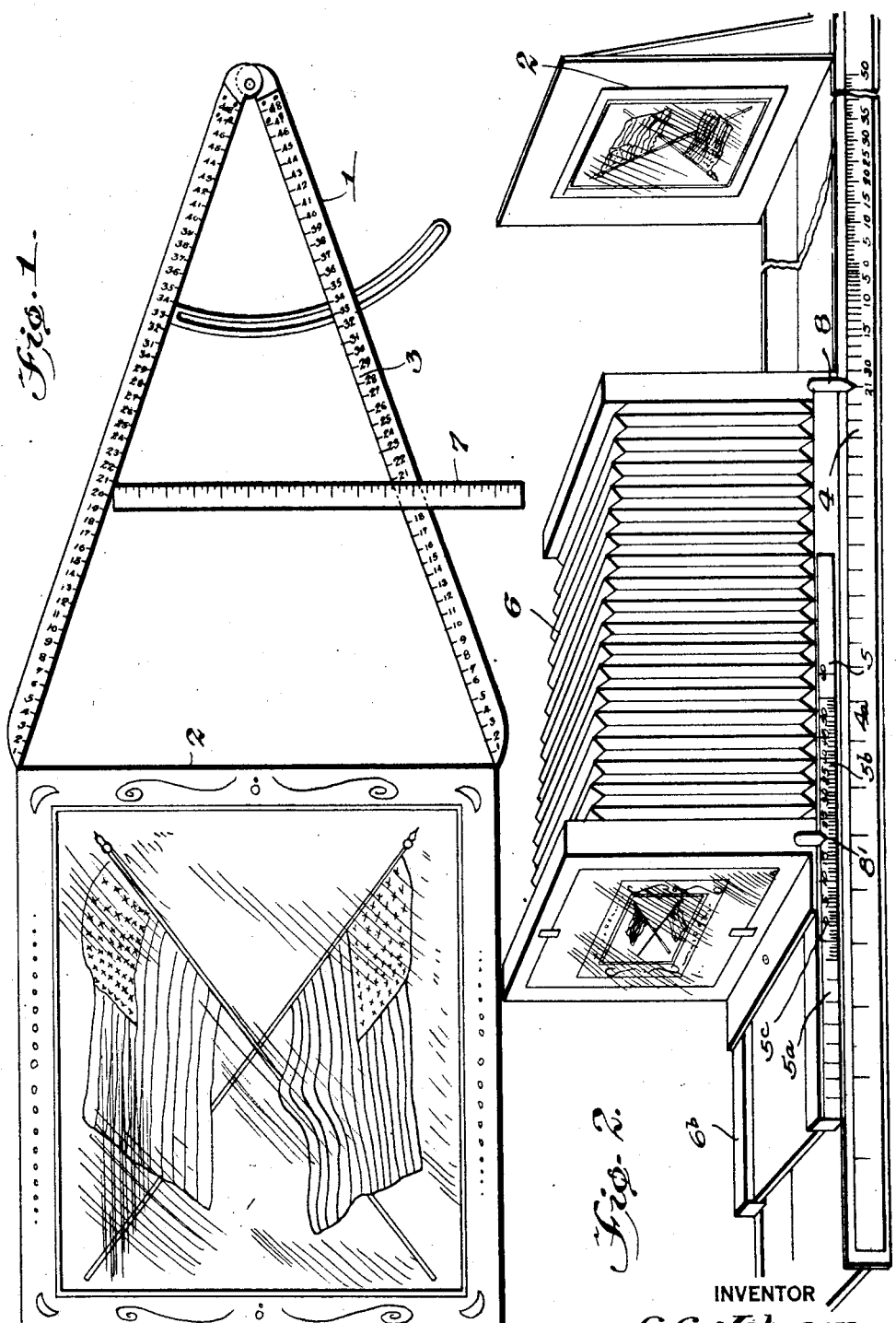
INVENTOR
C. G. Johnson,
BY
ATTORNEYS Patented Sept. 3, 1929.

1,727,288

UNITED STATES PATENT OFFICE.

CARL G. JOHNSON, OF EAU CLAIRE, WISCONSIN.

METHOD FOR PHOTOGRAPHING OBJECTS.

Application filed November 29, 1926. Serial No. 151,458.

This invention relates to a method for photographing objects, and has for its principal object to provide for such a method whereby to permit of the making of reproductions of objects, either in exact, reduced or enlarged size, with an accuracy, precision and facility not heretofore obtaining in any of the methods now known in the practice.

Another object of the invention is the provision of a method of the character set forth whereby the size, ratio or proportion of the photographic reproduction may be exactly determined without focusing the camera in the manner ordinarily employed for the purpose.

The method is to be carried out by means of a compass similar in form to a drafting compass, except for the fact that the legs of the compass are each provided with identical scales correspondingly divided into a number of divisions or graduations, from which readings are to be obtained and transferred to cooperative graduated scales placed on relatively movable parts of a camera of conventional design, which parts, when adjusted to such readings act to set the camera to proper focus as hereinafter described.

With the foregoing and other equally important objects in view, the invention resides in the certain new and useful combination, construction and arrangement as will be hereinafter more fully described, set forth in the appended claims, and illustrated in the accompanying drawings, in which:

Figure 1 represents a front elevation of the compass shown applied to the object to be photographed to determine the size to be reproduced.

Figure 2 is a perspective view showing the adaptation of the invention as applied to a photographic camera.

Referring more specifically to the drawings: the numeral 1 indicates a compass or dividers of conventional form, the points of which are shown placed on the edges of the object 2 which it is desired to photograph on a reduced scale. The compass is provided with scale grduations 3, preferably arranged in equi-distantly spaced relation and correspondingly on both legs thereof which are complemental to the scales 4 and 5 on the camera base for determining the setting of the camera 6 when the said camera is to be particularly operated. The numeral 7 indicates a straight edge, which is preferably in the form of a conventional ruler graduated in inches. Pointers 8 and 8' carried by the camera facilitate the adjustment and are cooperative with the scales 4 and 5 respectively, for the purpose. The graduations on the several scales 3, 4 and 5 cooperate to permit of a direct reading being obtained on the scales 3 and transferred to the scales 4 and 5 for the setting of the pointers 8 and 8' on the latter in accordance therewith, whereby the camera 6 will be set, or otherwise positioned, in proper focus, either for the proportional reduction or the proportional enlargement of the object to be photographed, as will be hereinafter more fully explained.

As shown in Figure 2, the scale 4 is extended longitudinally along the outer face of one side of the stationary base $6^a$, while the scale 5 is similarly extended along the outer side of the corresponding side of the relatively movable bed or slide $6^b$, on which the camera 6 is mounted with its forward end attached to and rising from the forward end of the said bed or slide, and its rear end in slidable engagement with the bed or slide for movement to either extend or contract the bellows connecting the fixed front end of the camera with the movable rear end thereof.

The scales 4 and 5 are each formed of sets of graduations $4^a$ and $4^b$, and $5^a$ and $5^b$, respectively, reading in reversed ascending order at the opposite sides of complemental zero points or graduations $4^c$ and $5^c$, the sets of graduations $4^a$ and $5^a$, of each scale 4 and 5, being irregular and increasing proportionately in spaced relation away from one side of their respective zero points or graduations $4^c$ and $5^c$, while the sets of graduations $4^b$ and $5^b$ are uniformly spaced apart at the opposite sides of the zero points $4^c$ and $5^c$. The graduations of both scales 4 and 5 are to be determined in accordance with known lensing formula.

The operation of the invention is as follows:

The points of the compass 1 are set on diametrically opposite edges of the photograph or other objects 2 to be reproduced. Assume that this object is twelve inches wide, and it is desired to take a picture thereof four inches in width. The procedure is to move the ruler 7 along the scale graduations on the opposite legs of the compass until a point thereupon is found where the shortest distance between the compass arms is four inches. The graduations on the compass arms at this point determines the camera setting, and the reading thereof will now be located on the scales 4 and 5 of the camera.

To now effect the setting of the camera, in accordance with the reading on the compass scales (graduation 21 being taken by way of illustration), the rear pointer 8 is moved along the scale 5 to the graduation (21) on the uniform scale section 5ᵇ corresponding to the number 21 indicated on the compass at the point at which the ruler was placed thereon, and the front pointer 8' of the camera is adjusted on the scale 4 to the graduation (21) of the irregular scale section 4ᵃ of said scale which corresponds to the number (21) on the compass legs at which the ruler was placed. The camera being thus adjusted relative to the object 2 to be photographed, the photographic image produced will be of the reduced size desired, without any focusing of the camera being necessary.

Similarly if an enlargement is to be made, instead of a reduction in size, the procedure will be as follows: Assume a copy of 4″ is desired to be enlarged to 12″. The points of the compass 1 are set by ruler 7 to measure 12 between the same and then moved along the legs as above described, to where the distance between the legs measures 4″ which, in the present instance, will be at the points 21 on the scales 3. The pointer 8 will be moved along the scale 4 of the graduation (21) on the irregular scale section 4ᵃ, while the pointer 8' will be moved along the scale 5 and on the uniform section 5ᵇ, when the bellows of the camera 6 will be extended, whereby the camera will be in proper focus for the photographing operation.

With both pointers 8 and 8' set to zeros 4ᶜ and 5ᶜ respectively, the camera 6 is in proper focus to reproduce the object at the same size, and as the camera is set to one side or to the other of the zero marks 4ᶜ and 5ᶜ, as hereinbefore indicated there is obtained a reduction or enlargement as the case may be, as will be readily apparent. There is another convenience in this arrangement, to the effect that if it is desired to know in just what proportion the height of the reproduction will be if the width is to be reduced from 12 inches to 4 inches, this can be readily ascertained by placing the points of the compass 1 on the upper and lower corners or edges of the object or copy 2, and then measuring with the ruler 7 the distance between the legs of the compass 1 at the graduations (21) from which the 4 inch reading was previously taken, and the reading on the ruler 7 will then give the exact height of the reproduction. This constitutes a most convenient and rapid manner of estimating.

It is, therefore, seen that the invention provides a ready means for adjusting a camera for making pictures of a desired size, either proportionately reduced or enlarged, or of the same size, as the case may be, and that the various units of the assembly, although in themselves largely conventional, nevertheless mutually and dependently cooperate to produce the desired result.

I claim:

1. The method of focusing an enlarging camera which consists in equipping a camera with identical graduated focusing scale indicia for cooperation with the front and rear ends of the camera, providing the legs of a compass with graduated scale indicia from which camera settings on the first mentioned scale are to be obtained, applying the points of the compass legs to the opposite sides or ends of an object to be photographed, measuring with a selected length of a conventional scaled ruler the corresponding distance between the compass legs at points on the scale thereof to accord to the size of the reproduction it is desired to make, and then setting the front and rear ends of the camera at the graduations on the scale cooperative therewith which correspond to the scale indications read from the compass legs at the points of intersection of the ruler with the same.

2. The method of focusing an enlarging camera which consists in equipping the camera with identical graduated focusing scale indicia for cooperation with the front and rear ends of the camera, said scales each having evenly spaced graduations on one side of a zero point thereof and unevenly spaced graduations at the other side thereof, providing the legs of a compass with identical graduated scale indicia of uniformly spaced graduations from which camera settings on the first mentioned scales are to be obtained, applying the points of the compass legs to the opposite sides or ends of an object to be photographed, measuring with a selected length of a conventionally scaled ruler the corresponding distance between the compass legs at points on the scales thereof to accord to the size of the reproduction it is desired to make, and then setting the front and rear ends of the camera at the graduation on the scales cooperative therewith which correspond to the scale indications read from the compass legs at the points of intersection of the ruler with the same.

CARL G. JOHNSON.